May 5, 1964  H. H. RHEA  3,131,549
HEAT PUMP CONTROL
Filed Nov. 29, 1962
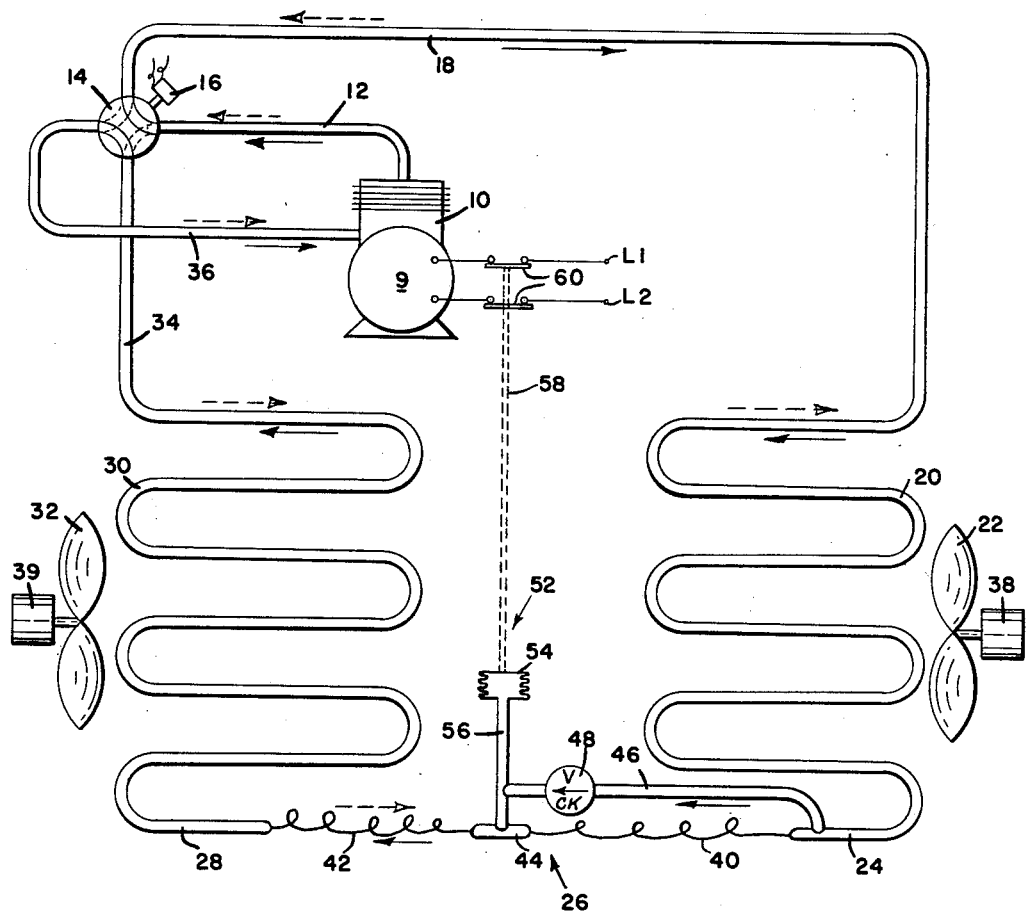
INVENTOR.
HAL H. RHEA.
BY
*Frederick E. McMullen*
ATTORNEY.

United States Patent Office 3,131,549
Patented May 5, 1964

3,131,549
HEAT PUMP CONTROL
Hal H. Rhea, North Syracuse, N.Y., assignor to Carrier Corporation, Syracuse, N.Y., a corporation of Delaware
Filed Nov. 29, 1962, Ser. No. 241,012
8 Claims. (Cl. 62—228)

This invention relates broadly to a refrigeration system, and more particularly to an air conditioning apparatus employing a reverse cycle refrigeration system.

In a refrigeration system, protection of the system compressor from possible damage occasioned by abnormal conditions occurring in the refrigeration system may be accomplished through the use of one or more controls operable to stop the compressor in response to predetermined system conditions. In particular, a control effective to stop the compressor at a preset refrigerant pressure in the line leading to the compressor suction side may be provided to obviate possible compressor damage. In a reverse cycle refrigeration system however, use of a similar control arrangement to protect the compressor from an abnormal refrigerant pressure at the compressor suction side is not feasible since refrigerant pressures in the line leading to the compressor suction side may range from above atmospheric pressure during operation of the system on the cooling cycle to below atmospheric pressure during operation of the system on the heating cycle.

In particular, it is understood that operation of the reverse cycle refrigeration system on the heating cycle often results in the outdoor heat exchange coil, functioning as an evaporator, becoming coated with an insulating layer of frost which impairs the heat transfer effectiveness of the outdoor coil with a resultant reduction in system efficiency. To remove accumulated frost, the refrigerant flow may be temporarily reversed to cause the outdoor coil to function as a condenser and the indoor coil to function as an evaporator. However, during the transient period following reversal of the system from the heating cycle to the defrost cycle, and vice versa, refrigerant pressure in the line leading to the compressor suction side often falls below atmospheric pressure, particularly during periods of low outdoor ambient conditions. Thus, a control effective to protect the compressor during cooling cycle operation may, during heating cycle operation, result in premature and unwarranted stoppage and cycling of the system compressor.

It is an object of this invention to provide a unique compressor protection arrangement for a reverse cycle refrigeration system.

It is a further object of this invention to provide a pressure sensitive control for a reverse cycle refrigeration system effective in response to an abnormal refrigeration system condition to stop the compressor.

It is an additional object of the present invention to provide a reverse cycle refrigeration system having control means operable in response to a preset refrigerant pressure at a median system pressure point to stop the system compression means.

This invention relates to an air conditioning apparatus including a refrigeration system operable to selectively heat or cool air comprising a compressor having an inlet and outlet, drive means for the compressor, indoor and outdoor heat exchange coils having refrigerant metering means therebetween, first conduit means normally coupling the indoor and outdoor heat exchange coils to the compressor inlet and outlet respectively, when the apparatus is used for cooling, valve means in the first conduit means between the indoor and outdoor coils and the compressor operable to couple the indoor and outdoor coils to the compressor outlet and inlet, respectively, when the apparatus is used for heating, control means for the drive means including means operable in response to a preset refrigeration pressure in the refrigerant metering means to deenergize the drive means to stop the compressor.

The present invention will be more fully understood by reference to the following description read in conjunction with the accompanying drawing wherein:

The figure is a schematic view of an air conditioning apparatus including a reverse cycle refrigeration system.

Referring to the drawing, there is shown an air-to-air type heat pump unit employing a refrigeration system operable under the reversible cycle principle. In apparatus of this type a first or indoor heat transfer coil is disposed within or in communication with the area to be conditioned and a second or outdoor heat transfer coil is located within or in communciation with an area outside the area to be conditioned, usually the ambient.

The heat pump unit is normally enclosed in a casing (not shown) partitioned by suitable means into an indoor compartment in communication with the area to be conditioned, and an outdoor compartment in communication with an area outside the area to be conditioned. The indoor heat exchange coil is located in the indoor compartment and the outdoor heat exchange coil is located in the outdoor compartment.

A compressor 10, normally positioned in the outdoor compartment, discharges relatively hot gaseous refrigerant through discharge line 12 to a four way reversing valve 14. Valve 14 serves to selectively reverse refrigerant flow through a portion of the refrigeration system in order to obtain the desired heating and cooling effects. Reversing valve 14 is controlled by solenoid 16 in a manner to be described hereinafter.

From the reversing valve 14 hot gaseous refrigerant flows, during the cooling cycle operation, through line 18 to the outdoor coil 20. Ambient air passed over the surface of coil 20 by fan 22 effects condensation of the gaseous refrigerant passing through the outdoor coil. The liquid refrigerant formed in coil 20 flows through line 24 to a suitable expansion means 26. The expansion means 26, to be more particularly described hereafter, provides the requisite pressure drop between the heat exchange coils in the refrigeration system.

The refrigerant thereafter flows through line 28 to the indoor coil 30, serving, during the cooling cycle, as an evaporator. Refrigerant passing through the indoor coil 30 is converted into gaseous refrigerant as it extracts heat from the stream of air flowing over the coil under the influence of fan 32. The gaseous refrigerant thereafter passes through line 34 to the reversing valve 14 from whence it flows through the compressor suction line 36 to the compressor 10 to complete the refrigerant flow cycle.

Fans 22 and 32 may be driven by electric motors 38 and 39 respectively. Alternatively, a single electric motor having fans 22 and 32 disposed at opposite ends of a double ended motor shaft may be used.

In operation of the heat pump unit described the four way reversing valve solenoid 16 may be actuated to place line 12 in communication with the indoor coil 30 and line 36 in communication with the outdoor coil 20 when it is desired to operate the unit on the heating cycle. Under these circumstances heat from the refrigerant flowing in the coil 30 is rejected to the stream of air flowing over the coil under the influence of fan 32. The rejection of heat from the refrigerant converts the gaseous refrigerant to liquid refrigerant which flows through the expansion means 26 to the outdoor coil 20, now functioning as an evaporator. The gaseous refrigerant created in the outdoor coil as a result of the heat transfer between the refrigerant and the ambient air passing thereover flows through line 18 and reversing valve 14 to the compressor 10.

In the embodiment shown the expansion means comprises a pair of capillary tubes 40, 42 connected to lines 24 and 28 respectively. A line 44 joints capillary tube 40 to capillary tube 42. A bypass line 46 joints line 24 to line 44. Bypass line 46 includes check valve 48 permitting flow through line 46 in the direction shown by the solid line arrow only, that is, toward the indoor coil 30. Flow through line 46 in the opposite direction, that is, toward outdoor coil 20, as represented by the dotted line arrow, is prevented.

During the cooling cycle operation liquid refrigerant from outdoor coil 20 flowing in the direction of the solid line arrow passes through line 46 and capillary tube 42 to the indoor coil 30. During the heating cycle operation liquid refrigerant from indoor coil 30, flowing in the direction of the dotted line arrow, passes through the capillary tubes 42 and 40 toward outdoor coil 20. In this instance valve 48 prevents flow through bypass line 46.

In order to protect the compressor 10 from damage occasioned by abnormal refrigerant pressures a control arrangement 52 effective to stop the compressor at a predetermined refrigerant pressure condition is provided. Control arrangement 52 includes a flexible diaphragm or bellows 54. A line 56 communicates diaphragm 54 with line 44. As is understood changes in system pressure are reflected in diaphragm movement. Thus, an increase in system pressure expands diaphragm 54 where as a decrease in pressure results in contraction of diaphragm 54. A switch operator 58 connected to the diaphragm 54 controls opening and closing of line switch 60 in response to diaphragm movement.

Compressor 10 includes an electric drive motor 9. Lines L1 and L2 connect motor 9 through normally closed line switch 60 to a suitable source of electric power. Line switch 60, when opened, interrupts the circuit to motor 9 to stop the compressor 10.

Control arrangement 52 is preset so that pressures occurring within the system during normal operation thereof are insufficient to cause diaphragm 54 to open switch 60. However, at a predetermined pressure, representing an abnormal system condition, diaphragm 54 moves sufficiently to cause switch operator 58 to open switch 60 to deenergize motor 9 and stop compressor 10.

Expansion means other than that shown may be contemplated. A single capillary tube may be employed in place of the dual series connected capillary tubes and bypass arrangement shown. In this alternate arrangement, pressure responsive control arrangement 52 is arranged to sense refrigerant system pressures at a suitable point in the capillary tube during the heating and defrost cycles. A second pressure responsive control, arranged to sense refrigerant system pressure in the compressor suction line during operation of the system on the cooling cycle, may be utilized to obtain complete system protection. As a further alternative, a pair of thermal expansion valves having suitable control means may be employed in place of the dual series connected capillary tubes and bypass arrangement of the embodiment shown. In this alternate arrangement, the pressure sensitive control is arranged to sense refrigerant system pressure between the expansion valves.

While I have described a preferred embodiment of the invention, it will be understood that the invention is not limited thereto since it may be otherwise embodied within the scope of the following claims.

I claim:

1. In a heat pump, a refrigeration system comprising compression means, reversing means, an outdoor coil, refrigerant metering means and an indoor coil interconnected in refrigerant flow relationship, and means operable in response to a predetermined refrigerant pressure at said refrigerant metering means to deenergize said compression means.

2. A heat pump as recited in claim 1 wherein said refrigerant metering means includes a first and second flow restricting means, said pressure responsive means being responsive to refrigerant system pressures intermediate said first and second flow restricting means.

3. In an air conditioning apparatus for a refrigeration system operable to selectively heat or cool air, the combination of a compressor having an inlet and an outlet, drive means for said compressor, first and second heat exchange coils, first conduit means including metering means coupling said first heat exchange coil to said second heat exchange coil, second conduit means normally coupling said first and second heat exchange coils to said compressor inlet and outlet respectively, when said apparatus is used for cooling, said second conduit means including valve means between said coils and said compressor operable to cause said first and second coils to be coupled to said compressor outlet and inlet respectively when said apparatus is used for heating, and control means for said drive means including means responsive to a predetermined refrigerant condition in said first conduit means for deenergizing said drive means.

4. Apparatus as recited in claim 3 wherein said last mentioned means comprises pressure sensitive means, and third conduit means communicating said pressure sensitive means with said first conduit means intermediate said metering means.

5. Apparatus as recited in claim 3 wherein said metering means includes first and second flow restricting means, fourth conduit means operable when said apparatus is used for heating to bypass said second flow restricting means, and third conduit means communicating with said first conduit means intermediate said first and second flow restricting means.

6. In a reverse cycle refrigeration system including a compressor, a motor for driving said compressor, a reversing mechanism, an indoor and outdoor heat exchange coils having conduit means including refrigerant metering means therebetween interconnected in refrigerant flow relationship, the combination of a source of electrical energy, circuit means including a normally closed switch means between said motor and said source of electrical energy adapted to energize said motor to drive said compressor, said switch means adapted when opened to interrupt said circuit means to deenergize said motor to stop said compressor, and control means for said switch means communicating said chamber with said conduit means, and means rigidly connecting said movable wall with said switch means, said control means opening said switch means to deenergize said motor to stop said compressor at a predetermined system pressure.

7. A reverse cycle refrigeration system as recited in claim 6, wherein said communicating means communicates said chamber with said refrigerant metering means.

8. A reverse cycle refrigeration system as recited in claim 6, wherein said refrigerant metering means includes first and second flow restricting means, said communicating means communicating with said conduit means intermediate said first and second flow restricting means.

References Cited in the file of this patent

UNITED STATES PATENTS

| | | |
|---|---|---|
| 2,276,814 | Zwickl | Mar. 17, 1942 |
| 2,589,384 | Hopkins | Mar. 18, 1952 |

UNITED STATES PATENT OFFICE
CERTIFICATE OF CORRECTION

May 5, 1964

Patent No. 3,131,549

Hal H. Rhea

It is hereby certified that error appears in the above numbered patent requiring correction and that the said Letters Patent should read as corrected below.

Column 3, line 18, strike out "the", first occurrence; column 4, line 8, strike out "a"; line 53, after "means" insert -- including a chamber having a movable wall, means --.

Signed and sealed this 5th day of January 1965.

(SEAL)
Attest:

ERNEST W. SWIDER
Attesting Officer

EDWARD J. BRENNER
Commissioner of Patents